Figure 1:
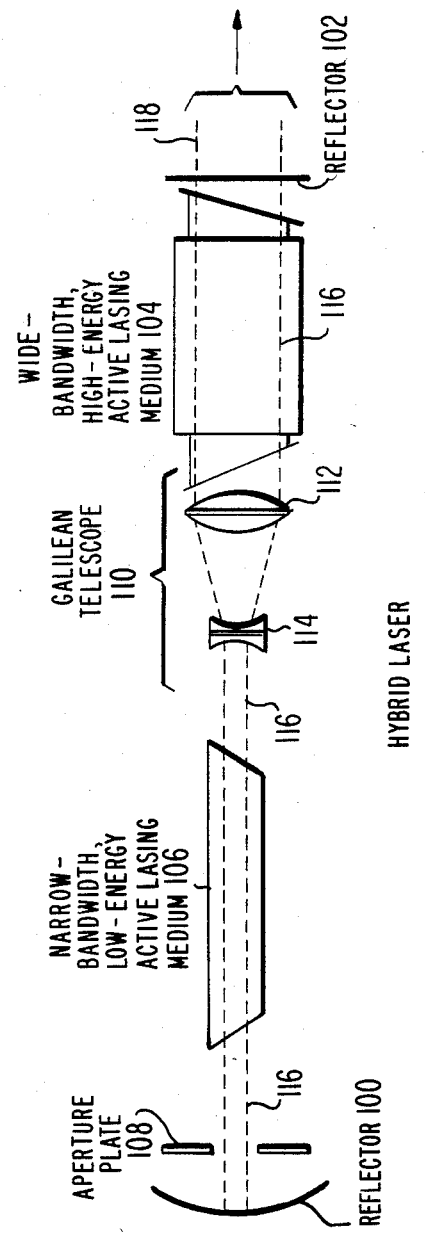

United States Patent [19]

Altman

[11] Patent Number: 4,554,666

[45] Date of Patent: Nov. 19, 1985

[54] HIGH-ENERGY, SINGLE LONGITUDINAL MODE HYBRID LASER

[75] Inventor: Wolf P. Altman, Richboro, Pa.

[73] Assignee: RCA Corporation, Princeton, N.J.

[21] Appl. No.: 444,454

[22] Filed: Nov. 24, 1982

[51] Int. Cl.[4] .............................................. H01S 3/098
[52] U.S. Cl. ...................................... 372/19; 372/101;
372/97; 372/83; 372/68; 372/102
[58] Field of Search ...................... 372/19, 83, 101, 68,
372/55, 97, 98, 26, 102

[56] References Cited

U.S. PATENT DOCUMENTS 3,586,998 6/1971 Gould ................................... 372/101
3,735,283 5/1973 Wuerker et al. ..................... 372/101

OTHER PUBLICATIONS

Chin; "Various Techniques for Producing a Single Longitudinal Mode TEA-$CO_2$ Laser"; *Optics & Laser Tech.*, Apr. 1980, pp. 85-88.
Gondhalekar et al.; "The Mechanism of Single-Frequency Operation of the Hybrid-$CO_2$ Laser"; *IEEE Jour. of Quant. Elect.*, vol. QE11, No. 3, Mar. '75.
Lavigne et al.; "TEA-Laser Emission of the Sequence Bands of $CO_2$", *Opt. Lett.*, vol. 2, No. 5, May '78.

*Primary Examiner*—William L. Sikes
*Assistant Examiner*—Léon Scott, Jr.
*Attorney, Agent, or Firm*—Joseph S. Tripoli; George E. Haas; George J. Seligsohn

[57] ABSTRACT

The use of a Galilean telescope, situated in between the two lasing mediums that are located within the resonant cavity of a single longitudinal mode hybrid laser, increases the effective mode volume and, hence, the amount of lasing energy that can be derived from such a hybrid laser.

9 Claims, 2 Drawing Figures

HIGH-ENERGY, SINGLE LONGITUDINAL MODE HYBRID LASER

This invention relates to high-energy lasers and, more particularly, to an improved laser for achieving high-energy in a single longitudinal mode (SLM). SLM operation of a laser is required for certain applications, such as heterodyne detection.

High-energy lasers, such as $CO_2$ transverse-excited-atmospheric (TEA) lasers, are known in the art. Such lasers are pulsed lasers. A TEA laser has a relatively wide bandwidth, since it operates near atmospheric pressure. For instance, a $CO_2$ TEA laser, operating at one atmospheric pressure, has a line width of approximately three GHz. Since a typical resonant cavity has a longitudinal mode separation of only 150 MHz, approximately 20 longitudinal modes operate simultaneously for such a $CO_2$ TEA laser.

Several techniques currently exist which can achieve SLM operation from a TEA laser. These techniques are discussed in some detail in the article "Various Techniques for Producing a Single Longitudinal Mode TEA-$CO_2$ Laser," by S. L. Chin, appearing in *Optics and Laser Technology*, Volume 12, Number 2, April 1980, pages 85–92. The most commonly used technique is known as a hybrid laser. In such a hybrid laser, a TEA laser and a low-pressure discharge laser are situated in serial relationship with one another within a common optical resonator. The low-pressure discharge laser is a continuous-wave (CW) low-energy laser that has a substantially smaller aperture than does the TEA laser. The low-pressure discharge laser, which operates at a typical pressure of 10-20 torr, also exhibits a much narrower bandwidth than does the TEA laser. More specifically, the bandwidth of a low-pressure discharge laser is typically less than the longitudinal mode separation (150 MHz) of the resonant cavity of such a hybrid laser, so that a hybrid laser operates only at that single longitudinal mode of the resonant cavity within the narrow bandwidth of the lower-pressure discharge laser.

The use of a hybrid laser to achieve SLM operation has several advantages. The hybrid is simple to implement. It only requires a simple stable laser resonator. Further, a hybrid laser provides a CW output that is available for frequency referencing and control. However, a distinct disadvantage of current hybrid lasers is that hybrid configurations using stable resonators, when operated in a single transverse mode, have a low mode volume. This is due to the narrow aperture of the low-pressure discharge laser. Therefore, to achieve high-energy output with a stable resonator, as employed in a hybrid laser, a longer laser would be required, and, even in this case, energy extraction efficiency tends to be very low.

Also known in the art is a TEA laser employing an unstable resonator and injection locking for achieving high-energy SLM operation. In this case, an injection-locking laser signal generated outside of the unstable TEA laser resonator is injected into the resonator by any one of several methods, such as beam splitters, hole couplers, or gratings. In general, injection locking requires that the injected cavity be adjusted so its longitudinal mode structure coincides with the injecting laser modes. Therefore, SLM operation of an injection laser employing an unstale resonator is more difficult to implement than is a hybrid laser. However, an unstable resonator achieves high mode volume energy extraction because unstable resonators have characteristics which allow high-energy outputs in a single transverse mode from a high Fresnel number cavity. Attempting to insert a low-pressure gain cell within an unstable resonator to emulate the hybrid approach would prove fruitless since CW operation of large aperture devices is difficult. Thus, it is difficult to obtain CW output from a large diameter gain cell needed to fill the unstable resonator high mode volume. A disadvantage of an unstable resonator is that it is more sensitive to mirror misalignment than is the stable resonator employed by a hybrid laser. In addition, the output intensity distribution of an unstable resonator has a doughnut shape (which can lead to system inefficiencies such as second harmonic generation and heterodyne detection). If extremely high average power (more than 10 kilowatts) laser output is desired, unstable resonators have a distinct advantage because they usually employ totally reflective elements, thereby eliminating intrinsic absorptive losses in the transmissive optics. Since at least one of the reflective elements of a stable resonator must be partially transmitting in order to derive a laser output, the intrinsic absorptive losses of a partially transmitting reflective element limits the amount of average power obtained from a stable resonator laser.

In the case of lasers generating an average power in the order of 100 watts or less, the intrinsic absorptive loss of partially transmitting reflective elements is not a problem. In this 100 watts average power range, pulsed SLM operation to achieve very high peak laser output powers (more than a joule of energy per pulse) currently still makes use of an injection-locked, unstable resonator laser (rather than a stable resonator hybrid laser), despite the simple implementation of a hybrid laser and the availability in the hybrid laser of a low-energy CW output for frequency referencing and control. The reason for this is that, up to this time, the low mode volume of an SLM hybrid laser employing a stable resonator has prevented its use as a pulsed laser providing a high peak power at an average power of the order of 100 watts. The present invention in directed to overcoming this problem of SLM operated pulsed hybrid lasers by providing means for significantly increasing the effective mode volume of such hybrid lasers.

More specifically, in accordance with the principles of the present invention, the energy output capability of an SLM hybrid laser is improved by the incorporation of a Galilean telescope situated within the laser resonant cavity. The Galilean telescope is located in between the two serially-situated active laser mediums of the hybrid laser, one of which is relatively wide aperture, high-energy active laser medium and the other of which is a relatively narrow aperture, low-energy active lasing medium. The high-energy active lasing medium has a first bandwidth within the frequency band of the resonant cavity, which first bandwidth is sufficiently wide to support a plurality of longitudinal oscillation modes of wave energy within the resonant-cavity frequency band. The low-energy active lasing medium has a second bandwidth within the first bandwidth which is sufficiently narrow to support only a single one of these longitudinal oscillation modes. Therefore, the hybrid laser operates in only the single longitudinal mode within the second bandwidth. The Galilean telescope is effective in concentrating the wave energy traveling in a direction from the high-energy active lasing medium toward the low-energy active lasing medium from a relatively wide aperture, occupied therby in the high-energy active lasing medium, to a relatively narrow aperture, occupied thereby in the low-energy active lasing medium. Further, the Galilean telescope is effective in expanding in size the wave energy traveling in a direction from the low-energy active lasing medium toward the high-energy active lasing medium from the relatively narrow aperture, occupied thereby in the low-energy active lasing medium, to the relatively wide aperture, occupied thereby in the high-energy active lasing medium. In this manner, the Galilean telescope increases the effective mode volume of the hybrid laser and permits the hybrid laser to realize the high-energy capability of the high-energy lasing medium in a single longitudinal mode.

In the drawings:

FIG. 1 schematically illustrates an embodiment of the present invention, and

Figure 2:
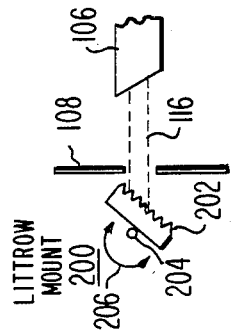

FIG. 2 schematically illustrates a modification of the embodiment shown in FIG. 1.

Referring to FIG. 1 there is shown a hybrid laser comprised of two spaced reflectors 100 and 102. In FIG. 1, reflector 100 is shown as a substantially totally reflective concave mirror and reflector 102 is shown as a partially reflective (partially transmissive) plane mirror. Spaced reflectors 100 and 102 cooperate to form a resonant cavity capable of supporting wave energy within a certain frequency band. Situated within this cavity is a relatively wide-bandwidth, high-energy active lasing medium 104 (e.g., a $CO_2$ TEA active lasing medium, for example) having its right end in proximity to reflector 102. Also included within the optical resonant cavity is narrow-bandwidth, low-energy active lasing medium 106 (e.g., a 10–20 torr $CO_2$ low-pressure discharge cell, for example). Active lasing medium 106 is aligned in serial relationship with active lasing medium 104 and the left end of active lasing medium 106 is situated in proximitiy to reflector 100. Active lasing medium 106 has a relatively narrow aperture compared to that of active lasing medium 104. Further, the size and position of the aperture of aperture plate 108, which is situated between the left end of active lasing medium 106 and reflector 100, is sufficently small to ensure that the hybrid laser can operate only in a single transverse mode, as is known in the art.

Galilean telescope 110 is situated within the resonant cavity in between high-energy active lasing medium 104 and low-energy active lasing medium 106. The Galilean telescope 110 is comprised of convex lens 112 and concave lens 114 spaced a given distance therefrom. Convex lens 112 has a certain focal length which is greater than the given distance between lenses 112 and 114 and concave lens 114 has a focal length which is substantially equal to the difference between the focal length of lens 112 and the given distance between lenses 112 and 114. Therefore, the respective positions of the focal points of lenses 112 and 114 substantially coincide at a point which is located to the left of concave lens 114. As known in the art, this relationship between the respective focal lengths of lenses 112 and 114 and the spacing therebetween results in lenses 112 and 114 operating as a Galilean telelscope. More specifically, a beam of collimated wave energy incident on either one of the lenses of Galilean telelscope 110 emerges as collimated wave energy from the other one of the lenses of a Galilean telescope, but the collimated wave energy to the left of concave lens 114 is concentrated into a narrower beam than the collimated wave energy emerging from convex lens 112. However, because the position of the focal points of lenses 112 and 114 is to the left of concave lens 114, the wave energy traveling in either direction from one of the lenses to the other one of the lenses is never focused to a point in a Galilean telescope, as is the case with non-Galilean telescopes. The aperture of convex lens 112 is sufficient to cooperate with the relatively wide aperture of high-energy active lasing medium 104, while the aperture of concave lens 114 is sufficient to cooperate with the relatively narrow aperture of low-energy active lasing medium 106.

As is known in the art, a hybrid laser generates a beam of wave energy 116 within the resonant cavity formed by spaced reflectors 100 and 102. A portion of this generated wave energy 116 passes through partially reflective (partially transmissive) reflector 102 to form a beam of laser output wave energy 118 traveling to the right. In order to maintain laser oscillations, the remainder of generated wave energy 116 is reflected back and forth between reflectors 100 and 102 of the resonant cavity. Traveling from left-to-right from reflector 100 to reflector 102, wave energy 116 passes, in turn, through the aperture of aperture plate 108, low-energy active lasing medium 106, Galilean telescope 110, and high-energy active lasing medium 104. A high-energy active lasing medium 104, such as a TEA lasing medium inherently has a bandwidth which is sufficiently wide to support a plurality of longitudinal oscillation modes within the frequency band of the resonant cavity. However, low-energy active lasing medium 106 has a sufficiently narrow-bandwidth within the wider bandwidth of high-energy active lasing medium 104 to provide an operating bandwidth for the hybrid laser that is sufficiently narrow so that the hybrid laser operates at only a single one of the plurality of longitudinal oscillation modes within the bandwidth of high-energy active lasing medium 104. Therefore, all of wave energy 116 and laser output wave energy 118 occurs at this single one of the aforesaid plurality of longitudinal oscillation modes.

The presence of Galilean telescope 110 results in decreasing the aperture of wave energy 116 traveling in a direction from high-energy active lasing medium 104 toward low-energy active lasing medium 106 (i.e., right-to-left) from the relatively wide aperture of high-energy active lasing medium 106. Similarly, the presence of Galilean telescope 110 results in increasing the aperture of wave energy 116 traveling in a direction from low-energy active lasing medium 106 toward high-energy active lasing medium 104 (i.e., from left-to-right) from the relatively narrow aperture of low-energy active lasing medium 106 to the relatively wide aperture of high-energy active lasing medium 104. In order to achieve a laser output beam 118 of high-energy, it is essential that high-energy active lasing medium 104 operate with high mode volume. This, in turn, requires that wave energy 116 passing in either direction through active lasing medium 104 have a wide aperture. On the other hand, it is also essential in order to achieve a single longitudinal mode and a single transverse mode that wave energy 116 passing in either direction through low-energy active lasing medium 106 and the aperture of aperture plate 108 have a narrow aperture. The presence of Galilean telescope 110 situated between active lasing mediums 104 and 106 of the hybrid laser ensures that both of these conditions are met, thereby permitting the hybrid laser shown in FIG. 1 to achieve high energy in a single longitudinal mode.

For illustrative purposes it has been assumed that the high-energy laser is a CO₂ TEA laser and that the low-energy laser is a CO₂ low pressure discharge cell. However, it should be understood that the high-energy and low-energy lasers can take any specific form and employ any lasing medium that can be utilized in a hybrid laser.

It should be understood further that reflectors 100 and 102 may take other forms from that specifically shown in FIG. 1. For instance, reflector 100 need not be either concave or totally reflecting. Either one or both of reflectors 100 and 102 may be partially reflecting (partially transmissive).

In the modification of the embodiment of FIG. 1 shown in FIG. 2, the substantially totally reflecting concave mirror forming reflector 100 in FIG. 1 is replaced in FIG. 2 with a Littrow mount 200. As schematically illustrated in FIG. 2, Littrow mount 200 is comprised of a rotatable reflective diffraction grating 202 having a predetermined line spacing. More particularly, diffraction grating 202 is mounted for angular rotation (as indicated by arrow 206) about an axis 204 extending in a direction normal to the plane of the paper. As is known in the art, a collimated beam of wave energy having a given wave length obliquely incident on a reflective diffraction grating, such as grating 202, reflects a first diffraction order collimated beam that is coincident with the incident beam if, and only if, the sine of the angle of incidence is equal to one-half the ratio of the given wavelength of the wave energy to the given line spacing of the diffraction grating. Wave energy beam 116 traveling from right-to-left, after emerging from high-gain active lasing medium 106, is in the form of a collimated beam. This collimated beam, after passing through the aperture of aperture plate 108, is incident on diffraction grating 202 at an oblique angle. By rotating diffraction grating 202 about axis 204, the angular position of diffraction grating 202 can be adjusted so that at only a particular desired wavelength, situated within the bandwidth of high-gain active lasing medium 106, does the sine of the angle of incidence of wave energy beam 116 just equal one-half the ratio of this desired wavelength to the line spacing of reflective grating 202. Therefore, only at this desired wavelength does the first-order reflected beam of wave energy, traveling left-to-right, coincide with the incident beam and re-enter the resonant cavity through the aperture in aperture plate 108. Further, by making reflective grating 202 a blazed grating, most of the reflected wave energy can be concentrated in this first-order beam, so that very little of the wave energy of the incident beam is lost from the resonant cavity upon reflection. Thus, Littrow mount 200 permits coarse tuning of the lasing wavelength of the single longitudinal mode selected by high-gain active lasing medium 106 to be easily achieved with high resolution. On the other hand, in the arrangement shown in FIG. 1, this coarse tuning requires micro-adjustments in the spacing distance between the two reflectors of the resonator, which is more difficult to accomplish than is tuning with a Littrow mount.

What is claimed is:

1. In a hybrid laser comprised of two spaced reflectors forming a given resonant cavity capable of supporting wave energy within a certain frequency band, and a relatively wide aperture, high-energy active lasing medium and a relatively narrow aperture, low-energy active lasing medium situated in serial relationship with one another within said given resonant cavity, said high-energy active lasing medium having a first bandwidth within said certain frequency band which first bandwidth is sufficiently wide to support a plurality of longitudinal oscillation modes of said wave energy and said low-energy active lasing medium having a second bandwidth within said first bandwidth which is sufficiently narrow to support only a single one of said plurality of longitudinal oscillation modes of said wave energy; the improvement wherein said hybrid laser further comprises:

means for achieving high energy in a single longitudinal mode from said hybrid laser, said means including a Galilean telescope situated within said given resonant cavity and located in between said low-energy active lasing medium and said high-energy active lasing medium (1) for concentrating the wave energy emerging from said high-energy active lasing medium and traveling in a direction from said high-energy active lasing medium toward said low-energy active lasing medium from the relatively wide aperture occupied thereby in said high-energy active lasing medium to the relatively narrow aperture occupied thereby in said low-energy active lasing medium and (2) for expanding in size the wave energy emerging from said low-energy active lasing medium and traveling in a direction from said low-energy active lasing medium toward said high-energy active lasing medium from the relatively narrow aperture occupied thererby in said low-energy active lasing medium to the relatively wide aperture occupied thereby in said high-energy active lasing medium.

2. The hybrid laser defined in claim 1, wherein said high-energy active lasing medium is a transverse-excited-atmospheric (TEA) lasing medium and said low-energy active lasing medium is a low-pressure gain cell.

3. The hybrid laser defined in claim 2, wherein each of said TEA lasing medium and said low-pressure gain cell employs $CO_2$ as the active lasing medium.

4. The hybrid laser defined in claim 1, wherein at least a given one of said two spaced reflectors comprises a partially reflecting mirror from which the output wave energy from said hybrid laser is obtained.

5. The hybrid laser defined in claim 4, wherein the other one of said two spaced reflectors comprises a substantially totally reflecting mirror.

6. The hybrid laser defined in claim 5, wherein said partially reflecting mirror is situated in proximity to said high-energy active lasing medium and said totally reflecting mirror is situated in proximity to said low-energy active lasing medium.

7. The hybrid laser defined in claim 6, including an aperture plate having an aperture of given size situated at a given position between said totally reflecting mirror and said low-energy active lasing medium for limiting operation of said hybrid laser to a single transverse mode.

8. The hybrid laser defined in claim 1, wherein said low-energy active lasing medium is operated as a continuous wave (CW) laser and said high-energy active lasing medium is operated as a pulsed laser.

9. The hybrid laser defined in claim 1, wherein one of said reflectors is comprised of a Littrow mount comprised of a rotatable reflective blazed diffraction grating having a predetermined line spacing.

* * * * *